United States Patent
Ishii (10) Patent No.: US 9,060,119 B2
(45) Date of Patent: Jun. 16, 2015

(54) IMAGE CAPTURING APPARATUS AND CONTROL METHOD FOR IMAGE CAPTURING APPARATUS

(71) Applicant: CANON KABUSHIKI KAISHA, Tokyo (JP)

(72) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/892,088

(22) Filed: May 10, 2013

(65) Prior Publication Data

US 2013/0308040 A1    Nov. 21, 2013

(30) Foreign Application Priority Data

May 15, 2012    (WO) .................. PCT/JP2012/062379

(51) Int. Cl.
*H04N 5/232*    (2006.01)
*H04N 5/369*    (2011.01)

(52) U.S. Cl.
CPC .......... *H04N 5/23212* (2013.01); *H04N 5/3696* (2013.01)

(58) Field of Classification Search
CPC .............. H04N 5/3696; H04N 5/2254; H04N 5/23293; H04N 5/23212
USPC ............... 348/345–356; 396/63–70, 213–262
See application file for complete search history.

(56) References Cited

U.S. PATENT DOCUMENTS

| | | | |
|---|---|---|---|
| 6,987,538 B1 * | 1/2006 | Nakata et al. ................. | 348/345 |
| 2008/0309771 A1 * | 12/2008 | Takahashi .................. | 348/208.4 |
| 2009/0175611 A1 * | 7/2009 | Kiyamura et al. ............. | 396/133 |
| 2009/0256952 A1 * | 10/2009 | Kusaka ......................... | 348/349 |
| 2012/0057069 A1 * | 3/2012 | Yamasaki ..................... | 348/345 |
| 2012/0057072 A1 * | 3/2012 | Yamashita .................... | 348/349 |

FOREIGN PATENT DOCUMENTS

| | | | |
|---|---|---|---|
| JP | 2000156823 A | 6/2000 |
| JP | 2001099644 A | 4/2001 |
| JP | 2008309882 A | 12/2008 |
| JP | 2010204294 A | 9/2010 |

* cited by examiner

*Primary Examiner* — Sinh Tran
*Assistant Examiner* — Xi Wang
(74) *Attorney, Agent, or Firm* — Canon USA Inc. IP Division (57) ABSTRACT

An image capturing apparatus includes: an imaging element including a first photoelectric conversion cell that outputs a first signal for phase difference detection obtained by detecting a plurality of light fluxes transmitted through different exit pupils of a photographing optical system using a plurality of focus detection pixels and a second photoelectric conversion cell that outputs a second signal for image generation obtained by detecting an object image transmitted through the photographing optical system using an imaging pixel. A contrast calculating unit calculates contrast information on the object image based on at least one of the first signal and the second signal; a focus detecting unit performs focus detection using a phase difference method on the basis of the first signal, and outputs an estimate for focus adjustment; a reliability estimating unit estimates reliability of a result obtained by the focus detecting unit.

8 Claims, 9 Drawing Sheets

IMAGE CAPTURING APPARATUS AND CONTROL METHOD FOR IMAGE CAPTURING APPARATUS

TECHNICAL FIELD

The present invention relates to an image capturing apparatus having a focus detecting function in a digital still camera or a video camera and a control method for the image capturing apparatus.

BACKGROUND ART

A technique for eliminating the necessity of a dedicated auto-focus (AF) sensor and for achieving high-speed phase difference AF (so-called imaging plane phase difference AF) is known. The foregoing can be accomplished by providing an image element with a phase difference detecting function and using an image element including an imaging pixel group, respectively.

For example, according to PTL 1 (patent literature document 1), in some light-receiving elements (pixels) of an imaging element (sensor), a pupil-dividing function is provided by causing a sensitivity region of a light-receiving part to be arranged off-axis (not-concentric) relative to the optical axis of an on-chip microlens. According to this technique, pixels that receive a pair of pupil-divided light fluxes are referred to as an A-image pixel and a B-image pixel. The A-image pixel and the B-image pixel are defined as focus detection pixels. A plurality of A-image pixels and B-image pixels are arranged at specific intervals in an imaging pixel group, and phase-difference focus detection is performed on the basis of the amount of deviation between two images acquired from the A-image pixel group and the B-image pixel group.

Here, a focus detection pixel differs from a pixel dedicated to imaging in terms of light-receiving characteristics in that the light-receiving area of the focus detection pixel is smaller than the light-receiving area of the pixel dedicated to imaging or the center of gravity of a light-receiving region is off-axis (located elsewhere than at the geometrical center) relative to the optical axis of an on-chip microlens. Thus, since a defect occurs in part of image information at a position where a focus detection pixel is arranged, interpolation arithmetic operation is performed, on the basis of information of pixels dedicated to imaging on the periphery of the position where the focus detection pixel is arranged, to generate an image signal.

Here, when the arrangement density of focus detection pixels is set to low, the degradation in the image quality caused by the pixel defect can be reduced. However, the sampling characteristics of a focus detection image is deteriorated, and the focus detection performance for an object having a high spatial frequency (for example, an object is a small point source of light) is degraded. Furthermore, in the case where the arrangement density of focus detection pixels is high, the position of an A-image pixel cannot be made to completely match the position of a B-image pixel on the sensor plane. Thus, an object that can be complemented at an A-image pixel cannot be complemented at a B-image pixel. Therefore, by calculating the amount of image deviation for different objects between an A image and a B image, an erroneous range finding may occur.

In a technique disclosed in PTL 2, a determination as to whether or not an object is suitable for focus detection using a focus detection pixel is performed, on the basis of spatial frequency distribution of image data. By determining whether or not focus detection using a focus detection pixel is to be performed on the basis of a determination result, the influence of erroneous range finding caused by the deterioration of sampling characteristics can be reduced.

CITATION LIST

Patent Literature

PTL 1 Japanese Patent Laid-Open No. 2000-156823
PTL 2 Japanese Patent Laid-Open No. 2010-204294

However, the known techniques described above have the problems described below.

In the technique disclosed in PTL 2, a determination as to whether or not an object is suitable for focus detection using a focus detection pixel is performed on the basis of the distribution of the spatial frequency of image data. Then, a determination as to whether or not focus detection using a focus detection pixel is to be performed is made on the basis of the determination result. Thus, for an object not suitable for focus detection using a focus detection pixel, there is a possibility of the object being in a state in which range finding using a focus detection pixel cannot be performed.

An object of the present invention is to achieve both accurate focus detection performance and prevention of the degradation of image quality. This is achieved, at least in part, by determining whether or not erroneous range finding is performed for a high-frequency object for which erroneous range finding caused by the degradation of the sampling characteristics is highly likely to occur when focus detection using a focus detection pixel is performed.

SUMMARY OF INVENTION

In order to achieve the above-mentioned object, an image capturing apparatus includes an imaging element including a first photoelectric conversion cell that outputs a first signal for phase difference detection obtained by detecting a plurality of light fluxes transmitted through different exit pupils of a photographing optical system using a plurality of focus detection pixels and a second photoelectric conversion cell that outputs a second signal for image generation obtained by detecting an object image transmitted through the photographing optical system using an imaging pixel; a contrast calculating unit for calculating contrast information on the object image based on at least one of the first signal and the second signal; a focus detecting unit for performing focus detection using a phase difference method on the basis of the first signal and outputting an estimate for focus adjustment; and a reliability estimating unit for estimating reliability of a result by the focus detecting unit. The reliability estimating unit estimates the reliability of the result by the focus detecting unit on the basis of correlation between a result by the contrast calculating unit and the result by the focus detecting unit.

Further features of the present invention will become apparent from the following description of exemplary embodiments with reference to the attached drawings.

DESCRIPTION OF EMBODIMENTS

Hereinafter, best modes for implementing the present invention will be explained in detail with reference to the attached drawings.

First Embodiment

Figure 1:
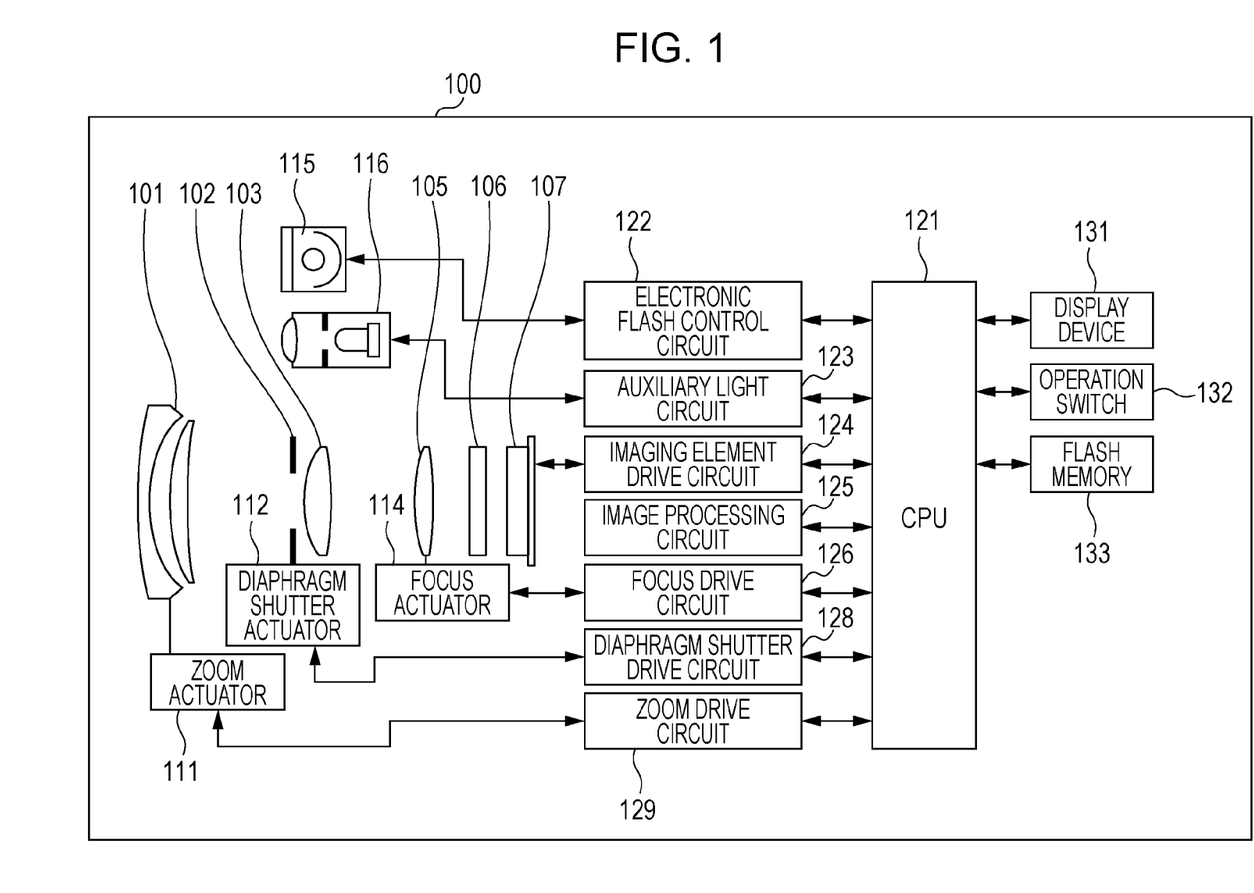
FIG. 1 is a block diagram of an image capturing apparatus according to a first embodiment of the present invention.

FIG. 1 is a block diagram of a camera serving as an image capturing apparatus using an imaging plane phase difference method according to the present invention. In FIG. 1, a camera serving as an image capturing apparatus 100 includes a camera main body including an imaging element 107 and photographing lenses integrated with one another. In this figure, 101 denotes a first lens group, which is arranged at the leading end of a photographing optical system (image-forming optical system) and is held so as to be capable of moving back and forth in an optical axis direction. Reference numeral 102 denotes a diaphragm shutter, which performs adjustment of light quantity at the time of photographing by adjusting the diameter of the aperture of the diaphragm shutter and has a function of an exposure-time adjusting shutter at the time of capturing a still image.

Reference numeral 103 denotes a second lens group. The diaphragm shutter 102 and the second lens group 103 move back and forth in the optical axis direction in such a manner that they are integrated with each other and perform a power-varying operation (zoom function) in conjunction with a back-and-forth moving operation of the first lens group 101.

Reference numeral 105 denotes a third lens group, which performs focus adjustment (focus function) when moving back and forth in the optical axis direction. Reference numeral 106 denotes an optical low-pass filter, which is an optical element for reducing false color or moire of a captured image. Reference numeral 107 denotes an imaging element including a C-MOS (complementary metal oxide) sensor and a peripheral circuit. As the imaging element, a two-dimensional single-plate color sensor in which on-chip primary-color mosaic filters of the Bayer array are formed on light-receiving pixels of m pixels in the horizontal direction and n pixels in the vertical direction is used.

The imaging element 107 includes a first photoelectric conversion cell that outputs a first signal for phase difference detection obtained by detecting a plurality of light fluxes transmitted through different exit pupils of the photographing optical system, using a plurality of focus detection pixels $S_{HA}$ and $S_{HB}$ and, a second photoelectric conversion cell that outputs a second signal for image generation obtained by detecting an object image transmitted through the photographing lenses, using an imaging pixel.

Reference numeral 111 denotes a zoom actuator, which performs a power-varying operation by rotating a cam cylinder (not illustrated) to drive the first lens group 101 towards (and away from) the third lens group 103 so as to move the first lens group 101 back and forth in the optical axis direction. Reference numeral 112 denotes a diaphragm shutter actuator, which controls the diameter of the aperture of the diaphragm shutter 102 to adjust the photographing light quantity and controls exposure time at the time of capturing a still image. Reference numeral 114 denotes a focus actuator, which performs focus adjustment by driving the third lens group 105 so as to move back and forth in the optical axis direction.

Reference numeral 115 denotes an object-illuminating electronic flash for photographing. A flash lighting device using a xenon tube is a suitable example for the object-illuminating electronic flash. However, a lighting device including an LED which continuously emits light may also be used. Reference numeral 116 denotes an AF auxiliary light unit, which projects an image of a mask having a specific aperture pattern via a light projection lens toward the field of view and improves the focus detection performance to a dark object or a low-contrast object.

Reference numeral 121 denotes a CPU (camera controller such as a microprocessor), which is a CPU built in a camera and performs various types of control of the camera main body. The CPU 121 includes an arithmetic operation part, a read-only memory (ROM), a random access memory (RAM), an analog-to-digital (A/D) converter, a digital-to-analog (D/A) converter, a communication interface circuit, and the like. The CPU 121 drives various circuits of the camera, on the basis of a specific program stored in the ROM, and performs a series of operations including automatic focusing (AF), photographing, image processing, recording, and the like.

Reference numeral 122 denotes an electronic flash control circuit, which controls turning on and off of the lighting unit 115 in synchronization with a photographing operation. Reference numeral 123 denotes an auxiliary light drive circuit, which controls turning on and off of the AF auxiliary light unit 116 in synchronization with a focus detection operation. Reference numeral 124 denotes an imaging element drive circuit, which controls an imaging operation of the imaging element 107. The imaging element drive circuit 124 also performs A/D conversion of an acquired image signal and transmits the A/D converted image signal to the CPU 121. Reference numeral 125 denotes an image processing circuit, which performs processing including γ conversion, color interpolation, JPEG compression (compression under the Joint Photographic Experts Group standard), and the like for an image acquired by the imaging element 107.

Reference numeral 126 denotes a focus drive circuit, which controls the focus actuator 114 to be driven on the basis of a focus detection result and performs focus adjustment by driving the third lens group 105 to move back and forth in the optical axis direction. Reference numeral 128 denotes a shutter drive circuit, which controls the diaphragm shutter actuator 112 to be driven so that the aperture of the diaphragm shutter 102 is controlled. Reference numeral 129 denotes a zoom drive circuit, which drives the zoom actuator 111 in accordance with a zoom operation by a photographer.

Reference numeral 131 denotes a display device, such as a liquid crystal display (LCD), which displays thereon information on a photographing mode of a camera, a preview image before photographing is performed, a confirmation image after photographing is performed, an in-focus state display image to be displayed when focus detection is performed, and the like. Reference numeral 132 denotes an operation switch group, which includes a power switch, a release (photographing trigger) switch, a zoom operation switch, a photographing mode selection switch, and the like. Reference numeral 133 denotes a removable storage medium, such as flash memory, which records thereon a photographed image.

Figure 2:
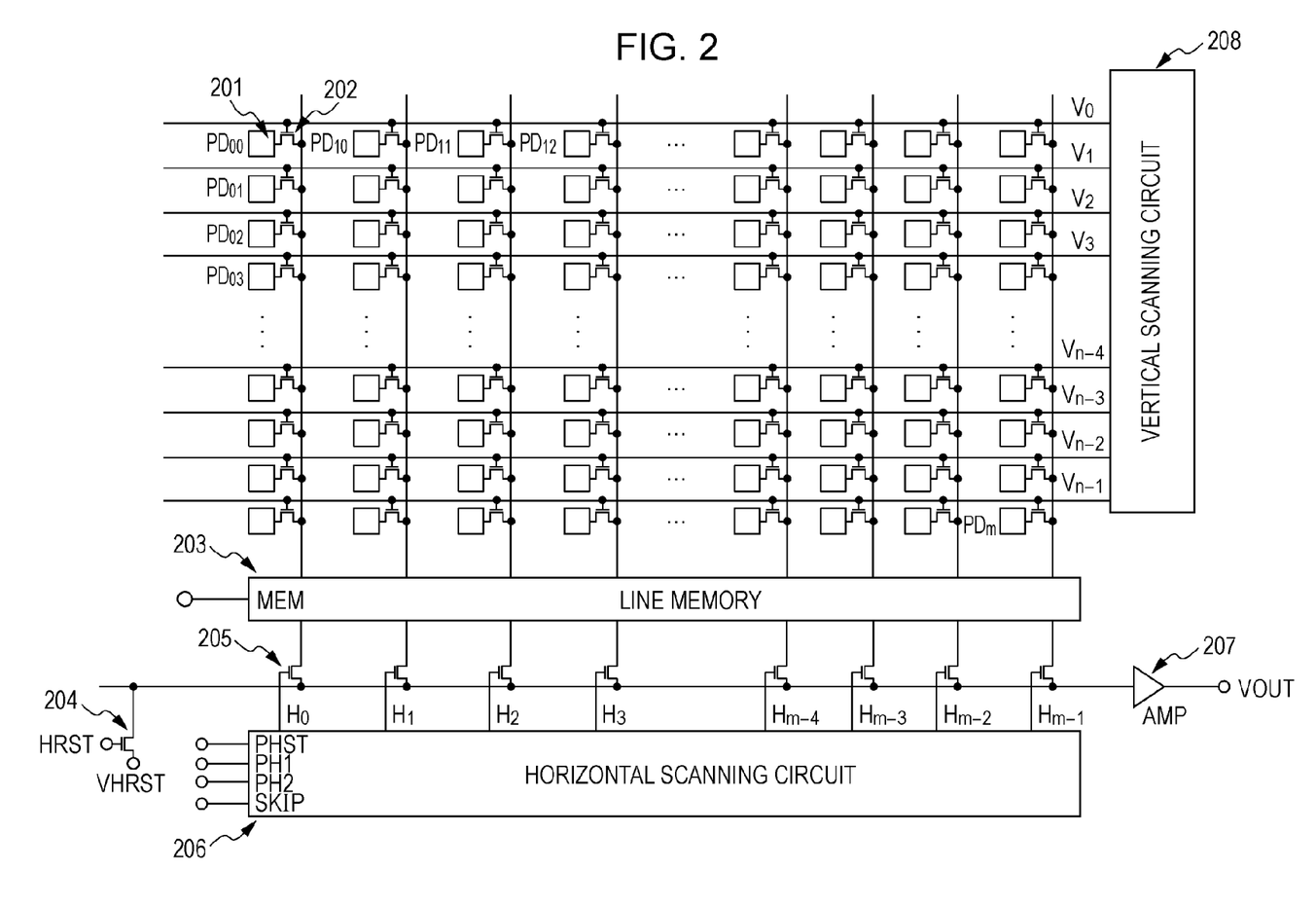
FIG. 2 is a block diagram of a solid-state imaging element in the first embodiment of the present invention.

FIG. 2 is a block diagram of an imaging element. The block diagram of FIG. 2 illustrates a simplified configuration for explaining a reading operation, and an image reset signal and the like are omitted. In FIG. 2, reference numeral 201 denotes a photoelectric conversion part (hereinafter, abbreviated as $PD_{mn}$), which includes a photodiode, a pixel amplifier, a switch for resetting, and the like. Herein, m represents an address in an X direction of the sensor, where positions in the X direction of the sensor vary from X=0, 1, . . . to m−1; and n represents an address in a Y direction of the sensor, where Y positions vary from Y=0, 1, . . . m−1). In other words, the imaging element used in the present invention includes an m×n array of photoelectric conversion parts arranged two-dimensionally. Reference signs are provided only near a photoelectric conversion part $PD_{00}$, which is arranged in an upper left portion, in order to avoid complexity.

Reference numeral 202 denotes a switch for selecting output of signals from a photoelectric conversion part $PD_{mn}$. The switches 202 are selected row by row by a vertical operation circuit 208.

Reference numeral 203 denotes a line memory for temporarily storing therein output of the photoelectric conversion part $PD_{mn}$ represented by reference numeral 201. The line memory 203 stores therein outputs of photoelectric conversion parts for one row selected by the vertical scanning circuit. Normally, a capacitor is used as the line memory.

Reference numeral 204 denotes a switch that is connected to a horizontal output line and that is used for resetting the horizontal output line to a specific potential VHRST. The switch 204 is controlled on the basis of a signal HRST.

Reference numeral 205 denotes a switch for sequentially outputting outputs of the photoelectric conversion parts $PD_{mn}$ stored in the line memory, which is represented by reference numeral 203, described above to a horizontal output line. By sequentially performing scanning for the switches $H_0$ to $H_{m-1}$ by a horizontal scanning circuit, which is represented by reference numeral 206 and will be described later, outputs of photoelectric conversion for one row are read.

Reference numeral 206 denotes a horizontal scanning circuit, which sequentially operating outputs of the photoelectric conversion parts stored in the line memory and outputs the operated outputs to a horizontal output line. A signal PHST is data input to the horizontal scanning circuit, and PH1 and PH2 denote shift clock inputs. The horizontal scanning circuit 206 is configured such that data is set when the shift clock input PH1=1 and data is latched on the basis of the shift clock input PH2. By inputting shift clocks to PH1 and PH2, the signal PHST is sequentially shifted, so that the switches $H_0$ to $H_{m-1}$ can be sequentially turned on. SKIP denotes a control terminal input for allowing setting to be done for decimation reading. By setting the SKIP terminal to H level, the horizontal scanning circuit can be skipped at specific intervals.

Reference numeral 207 denotes a vertical scanning circuit, which can perform selection of the selection switches 202 for the photoelectric conversion parts $PD_{mn}$ by performing sequential scanning and outputting $V_0$ to $V_{n-1}$. Similar to the horizontal scanning circuit, a control signal is controlled in accordance with a data input PVST, shift clocks PV1 and PV2, and a decimation reading setting SKIP. Since the operation of the vertical scanning circuit is similar to the operation of the horizontal scanning circuit, the detailed explanation of the operation of the vertical scanning circuit will be omitted. Furthermore, in this figure, the control signal mentioned above is not illustrated.

FIGS. 3A, 3B, 4A, 4B, and 5 are diagrams for explaining the configuration of imaging pixels and the configuration of focus detection pixels. In this embodiment, the Bayer array is adopted in which a pixel having a spectral sensitivity of G (green) is arranged as each of two diagonal pixels of four pixels of 2×2 and pixels having spectral sensitivities of R (red) and B (blue) are arranged as the other two pixels. Focus detection pixels having the configuration described below are arranged in a dispersed manner in accordance with a specific pattern in the Bayer array.

Figure 3A:
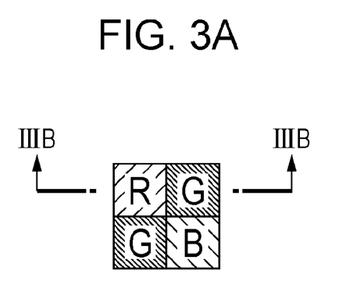
FIGS. 3A and 3B are respectively a plan view and a cross-sectional view of imaging pixels of the imaging element in the first embodiment of the present invention.
Figure 3B:
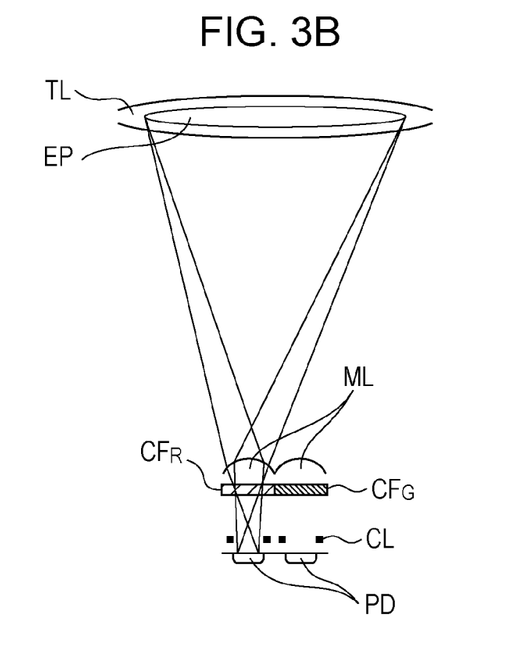

FIGS. 3A and 3B illustrate the arrangement and configuration of imaging pixels. FIG. 3A is a plan view of 2×2 imaging pixels. As is well known, in the Bayer array, G pixels are diagonally arranged, and R and B pixels are arranged as the other two pixels. Such a configuration of two rows and two lines is repeatedly provided.

The cross section IIIB-IIIB of FIG. 3A is illustrated in FIG. 3B. Reference sign ML denotes an on-chip microlens arranged on the foreground of each of the pixels, reference sign $CF_R$ denotes an R (Red) color filter, and reference sign $CF_G$ denotes a G (Green) color filter. Reference sign PD represents a schematically illustrated photoelectric conversion part of a C-MOS sensor, and reference sign CL denotes a wiring layer for forming a signal line through which various signals in the C-MOS sensor is transmitted. Reference sign TL represents a schematically illustrated photographing optical system.

Here, the on-chip microlens ML and the photoelectric conversion part PD of an imaging pixel are configured in such a manner that light flux transmitted through the photographing optical system TL can be captured as effective as possible. In other words, an exit pupil EP and the photoelectric conversion part PD of the photographing optical system TL have a conjugate relationship with each other due to the microlens ML, and the effective area of the photoelectric conversion part is designed to be large. Furthermore, although the light flux incident to the G pixels is explained with reference to FIG. 3B, the R pixel and the B (Blue) pixel have the same configuration. Thus, the diameter of the exit pupil EP corresponding to each of RGB imaging pixels is large, and the S/N ratio of an image signal can be improved by effectively capturing light flux from an object.

Figure 4A:
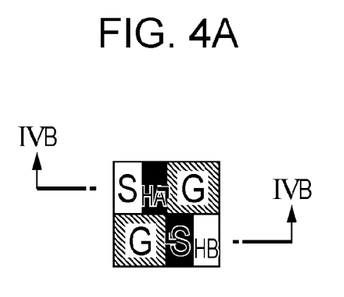
FIGS. 4A and 4B are respectively a plan view and a cross-sectional view of focus detection pixels of the imaging element in the first embodiment of the present invention.
Figure 4B:
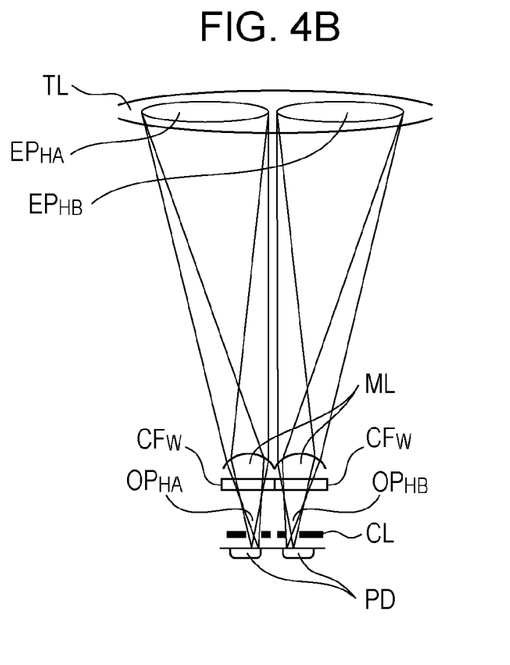

FIGS. 4A and 4B illustrate the arrangement and configuration of focus detection pixels for performing pupil division in the horizontal direction (lateral direction) of the photographing optical system. Here, the definition of the horizontal direction or the lateral direction indicates the direction that is orthogonal to the optical axis of the photographing optical system and that is along a straight line extending in the horizontal direction when a camera is set in such a manner that the optical axis of the photographing optical system is horizontal.

FIG. 4A is a plan view of pixels of two rows and two lines including focus detection pixels. In the case where an image signal is obtained for recording or observation, a main component of brightness information is acquired at the G pixels. Since the human's image recognition characteristics are sensitive to brightness information, the degradation in image quality is easily recognized when a G pixel is defective. Meanwhile, an R or B pixel is a pixel at which color information (color difference information) is obtained. Since the human's visual characteristics are insensitive to color information, the degradation in image quality is not easily recognized even when some pixels at which color information is obtained are defective.

In this embodiment, G pixels of pixels of two rows and two lines are left as imaging pixels, and R and B pixels are replaced with focus detection pixels. These pixels are represented as $S_{HA}$ and $S_{HB}$ in FIG. 4A.

The cross section IVB-IVB of FIG. 4A is illustrated in FIG. 4B. The microlenses ML and the photoelectric conversion parts PD have the same configuration as the imaging pixels illustrated in FIG. 3B). In this embodiment, since a signal of a focus detection pixel is not used for image generation, a transparent film $CF_W$ (White) is arranged instead of a color-separation color filter. Furthermore, in order that pupil division is performed by the imaging element, an opening portion of each of the wiring layers CL is off-axis in one direction relative to the center line of the corresponding microlens ML. More specifically, since an opening portion $OP_{HA}$ of the pixel $S_{HA}$ is arranged off-axis to the right, light flux transmitted through an exit pupil $EP_{HA}$, which is in a left portion of the photographing optical system TL, is received. Similarly, since an opening portion $OP_{HB}$ of the pixel $S_{HB}$ is arranged off-axis to the left, light flux transmitted through an exit pupil $EP_{HB}$, which is in a right portion of the photographing optical system TL, is received.

Accordingly, an object image obtained using a pixel group of pixels $S_{HA}$ that are regularly arranged in the horizontal direction is defined as an image A. Furthermore, an object image obtained using a pixel group of pixels $S_{HB}$ that are regularly arranged in the horizontal direction is defined as an image B. By detecting the relative positions of the image A and the image B, the focus deviation amount (defocus amount) of an object image can be detected.

Figure 5:
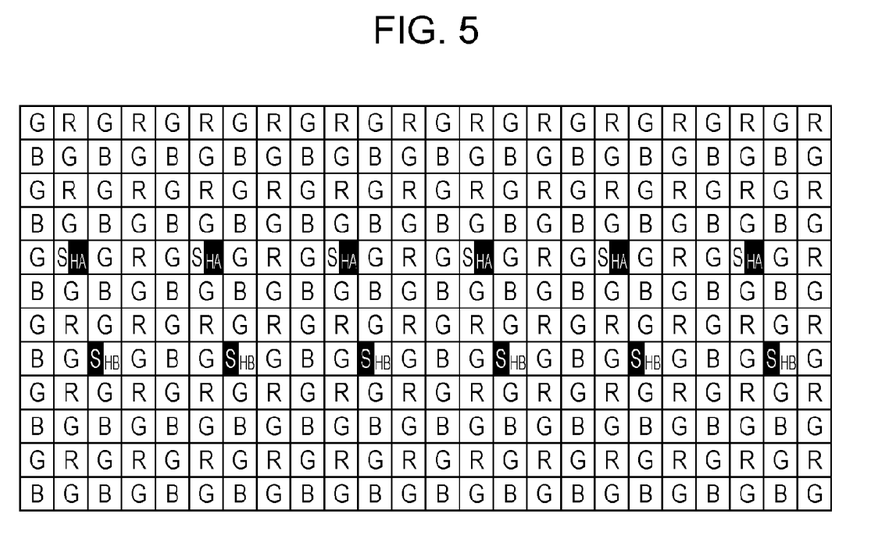
FIG. 5 illustrates a larger view of the arrangement region of focus detection pixels of the imaging element in the first embodiment of the present invention.

FIG. 5 is a diagram illustrating the arrangement of imaging pixels and focus detection pixels. In this figure, G represents a pixel to which a green filter is applied, R represents a pixel to which a red filter is applied, and B represents a pixel to which a blue filter is applied. Reference sign $S_{HA}$ in this figure denotes a pixel for focus detection, which is formed by causing an opening of a pixel portion to be off-axis in the horizontal direction. The pixels SHA are a standard pixel group for detecting the amount of image deviation in the horizontal direction relative to an SB pixel group, which will be described later. Furthermore, reference sign $S_{HB}$ denotes a pixel formed by causing an opening of a pixel to be off-axis in the direction opposite the $S_{HA}$ pixels. The pixels $S_{HB}$ are a reference pixel group for detecting the amount of image deviation in the horizontal direction relative to the $S_{HA}$ pixel group. White portions of the $S_{HA}$ and $S_{HB}$ pixels represent opening positions of off-axis pixels.

Figure 6:
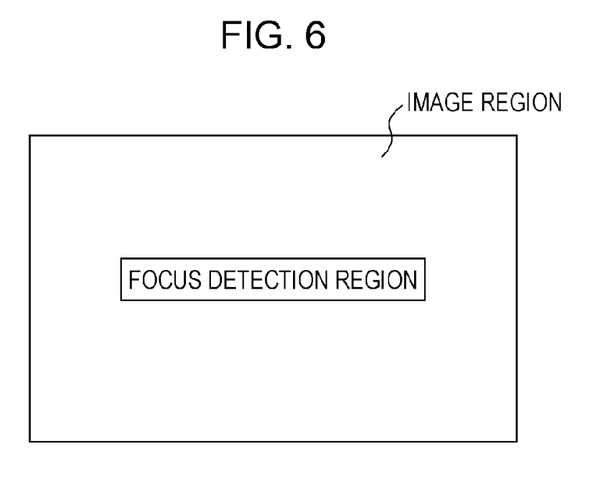
FIG. 6 is a diagram illustrating the arrangement region of the focus detection pixels of the imaging element in the first embodiment of the present invention.

FIG. 6 illustrates an example illustrating a focus detection region on an imaging screen. In this figure, the pixels are arranged as illustrated in FIG. 5 in the focus detection region, and the focus detection region contains a plurality of range-finding lines or one range-finding line. In this embodiment, the focus detection region contains a plurality of range-finding lines, and a range-finding line to be used is selected in accordance with the reliability of the focus adjustment state calculated for the range-finding line. Furthermore, although the focus detection region is arranged at the center of the imaging screen in this embodiment, a plurality of focus detection regions may be arranged, and an image may be sampled using a focus detection pixel from an object image formed in each of the regions.

Figure 7:
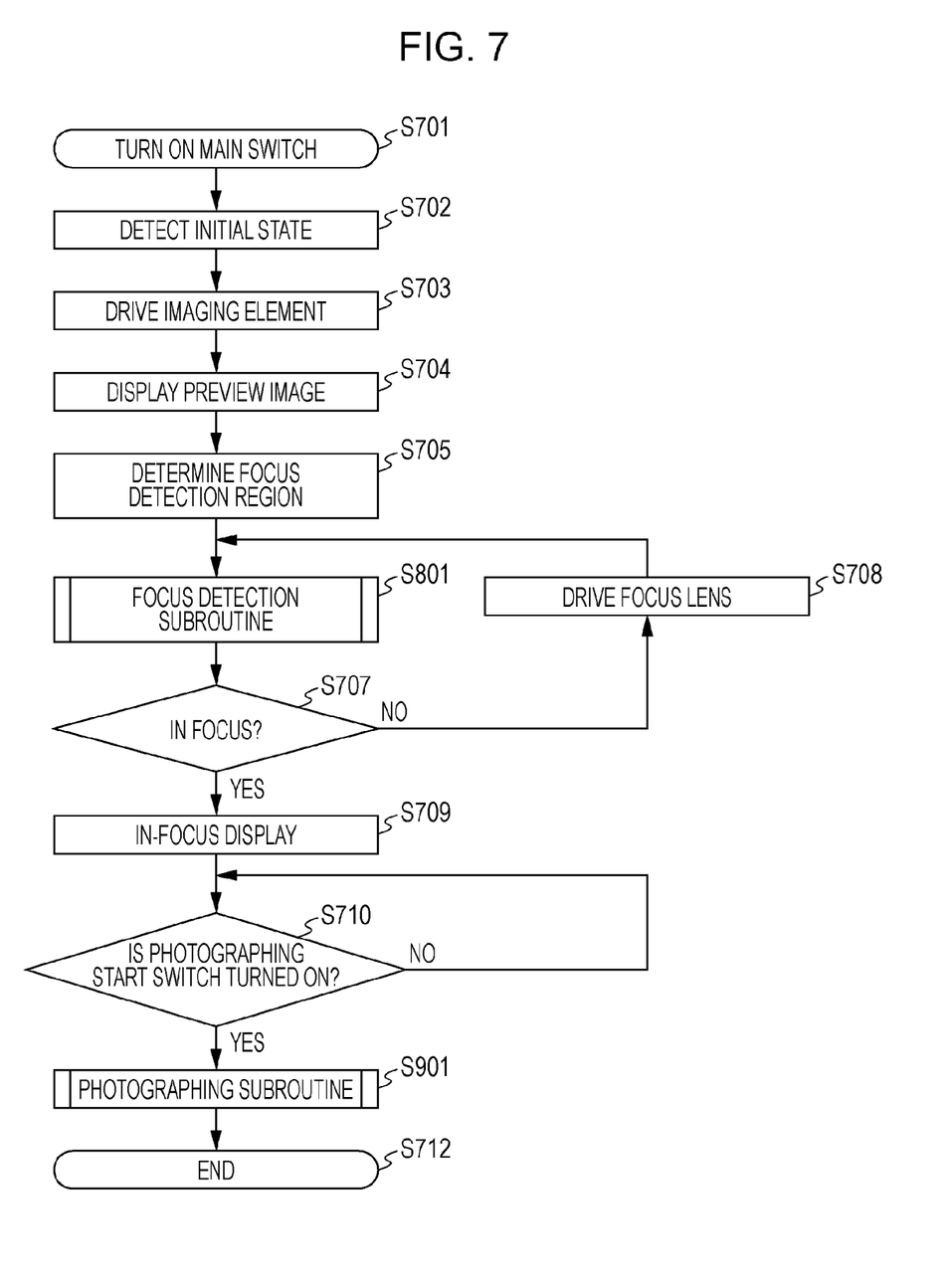
FIG. 7 is a flowchart illustrating an operation of an image capturing apparatus (a camera) in the first embodiment of the present invention.
Figure 8:
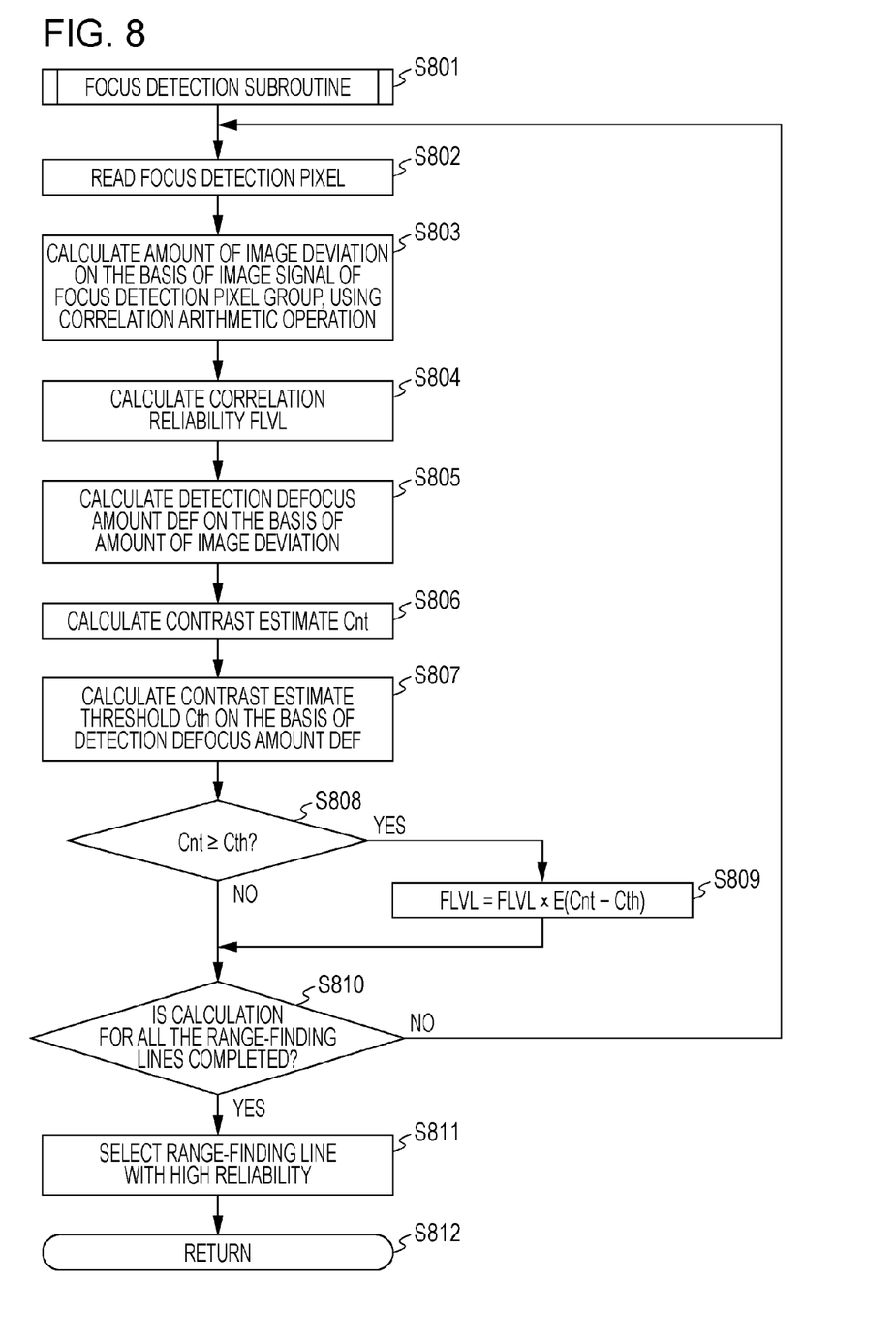
FIG. 8 is a flowchart illustrating a focus detection algorithm operation according to the first embodiment of the present invention.
Figure 9:
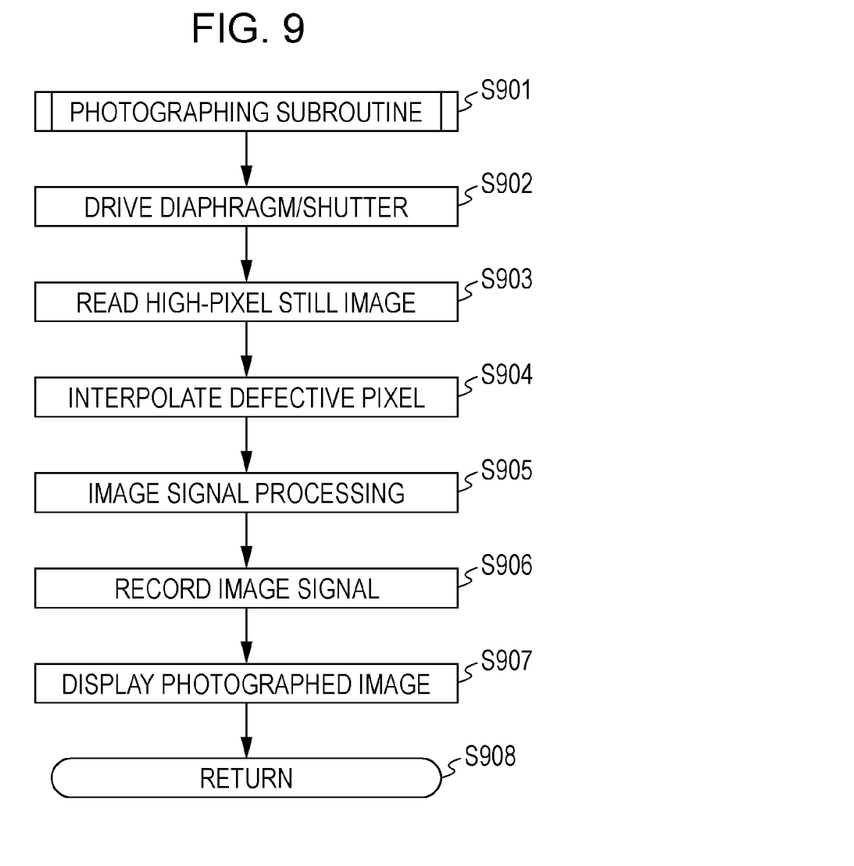
FIG. 9 is a flowchart illustrating a photographing operation in the first embodiment of the present invention.

FIGS. 7 to 9 are flowcharts for explaining processes for focus adjustment and photographing by a camera serving as an image capturing apparatus of an imaging plane phase difference method. The control flows illustrated in FIG. 7 and the subsequent figures will be explained also with reference to the figures described above.

FIG. 7 is a flowchart illustrating an operation of a camera in this embodiment.

When an operator performs a main-switch-on operation for a power switch of the camera (step S701), the CPU 121 performs checking of operations of individual actuators and the imaging element in the camera, initializes the memory contents and an execution program, and performs a photographing preparation operation in step S702. In step S703, an imaging operation by the imaging element starts, and a low-pixel moving image for preview is output. In step S704, a read moving image is displayed on the display device 131, which is provided on the rear side of the camera, and the operator determines the composition for photographing while viewing the preview image.

In step S705, a focus detection region is determined from an image region. In this embodiment, since a range-finding point is arranged only at the center as illustrated in FIG. 6, a central region is selected. Then, the process proceeds to step S801, and a focus detection subroutine is performed.

FIG. 8 is a flowchart of the focus detection subroutine. After the process jumps from step S801 of the main flow to this subroutine, focus detection pixels contained in the focus detection region determined in step S705 of the main routine are read in step S802. In step S803, correlation arithmetic operation for obtained two images is performed, and the relative amount of a positional deviation between a pair of image signals (two images) is calculated. Correlation arithmetic operation represented by formula (1) is performed for the pair of image signals (a1 to an, b1 to bn: a represents a line signal for the image A, b represents a line signal for the image B, and n represents the number of pieces of data) read from the focus detection pixel sequence, and the correlation amount Corr(l) is calculated. Here, ak represents the kth pixel signal for the image A, and bk represents the kth pixel signal for the image B.

$$\text{Corr}(l) = \sum_{k=0}^{n-1-1} |a_k - b_{k+1}| \qquad (1)$$

Figure 10:
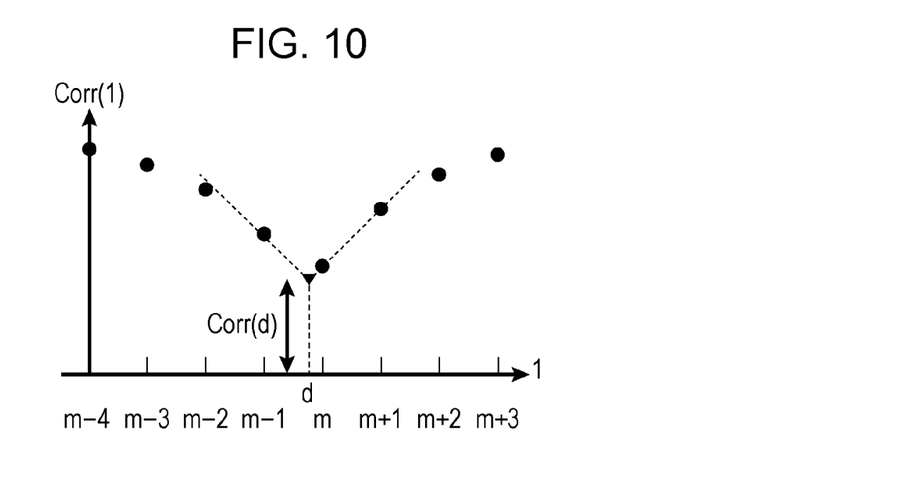
FIG. 10 is an explanatory diagram of correlation arithmetic operation in the first embodiment of the present invention.

In formula (1), l represents the image shift amount, and the number of pieces of data when an image is shifted is limited to n−1. In addition, the image shift amount l is an integer and represents the relative shift amount based on the unit of the data interval of data lines. Regarding the calculation result of this formula, the minimum correlation amount Corr(l) is obtained when the correlation between a pair of data items is highest, as illustrated in FIG. 10. Furthermore, by using the amount of correlation Corr(m) (the minimum shift amount m) and the amount of correlation calculated as a shift amount close to m, a shift amount d which provides the minimum value Corr(d) to consecutive correlation amounts is calculated using a three-point interpolation method.

In step S804, the reliability of the result of the correlation arithmetic operation is calculated. Here, the reliability indicates the degree of coincidence FLVL of two images. The degree of coincidence FLVL of a pair of image signals (two images) is defined as the reciprocal of the value Corr(d) (1/Corr(d)) at the highest correlation to the amount of correlation Corr(l) calculated in formula (1). When the defocus amount is large, the asymmetry between the image A and the image B is large. Thus, the degree of coincidence FLVL of the two images is small, and the reliability is degraded. Usually, the degree of coincidence FLVL of two images to the defocus amount exhibits the relationship represented by the solid lines illustrated in FIG. 11. As the position of a lens becomes closer to an in-focus position, the calculated degree of coincidence FLVL of two images becomes higher, and a higher reliability tends to be obtained.

In the subsequent step S805, the defocus amount DEF is calculated by multiplying the amount of image deviation calculated in S803 by a specific defocus conversion factor.

Then, in step S806, the contrast estimate Cnt of focus detection signals is calculated using formula (2). Here, ak represents the kth pixel signal of the image A.

$$Cnt = \frac{\sum_{k=0}^{n-1}(a_k - a_{k+1})^2}{\sum_{k=0}^{n-1}|a_k - a_{k+1}|} \qquad (2)$$

Here, n in formula (2) represents the number of pixels of a focus detection line signal. For example, the relationship between the contrast estimate Cnt expressed by this formula and the defocus amount to a black and white edge chart serving as a high-frequency object is represented by the solid lines in FIG. 12. This figure is a diagram illustrating a relationship in which as the defocus amount decreases, an object image becomes sharper and the contrast estimate Cnt, which is contrast information, thus becomes higher. Normally, in the case where range-finding calculation using focus detection pixels is performed, the relationship between the contrast estimate Cnt, which is contrast information, and detection defocus to various objects is contained within the solid lines of FIG. 12. However, for some objects, the relationship may be outside the curves of FIG. 12 in the case where erroneous range finding occurs. In the case where the calculation result of the detection defocus is large even when the contrasts estimate Cnt is high, it is unlikely that the range-finding calculation is performed accurately. Thus, erroneous range finding is highly likely to occur. Therefore, for range-finding calculation, the reliability needs to be degraded.

Figure 12:
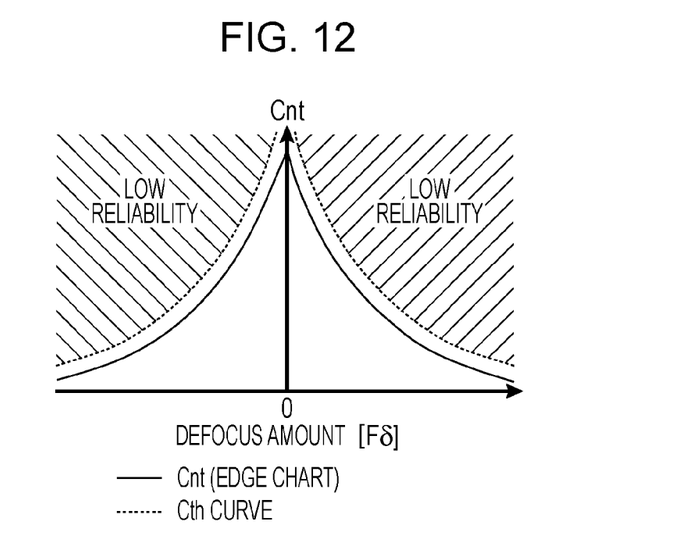
FIG. 12 is a relationship diagram of a contrast estimate and detection defocus in the first embodiment of the present invention.

In FIG. 12, in the case where the contrast estimate Cnt is large and the defocus amount DEF [Fδ] (F represents an F number and δ represents the diameter of permissible circle of confusion) is near zero, it is determined that the reliability is high (reliable). In the case where the contrast estimate Cnt is small and the defocus amount DEF [Fδ] is large, it is determined that the reliability is low (unreliable).

By performing the determination as to the reliability illustrated in FIG. 12, in the case where the defocus amount DEF [Fδ] is large even when the contrast estimate Cnt is large, it is determined that the reliability is low (unreliable). Thus, both the maintenance of the focus detection performance based on the imaging plane phase difference AF and the prevention of the deterioration of image quality can be achieved.

The CPU 121 serving as a reliability estimating unit estimates, on the basis of the correlation illustrated in FIG. 12 between the result by the CPU 121 serving as a contrast calculating unit and the result by the imaging element 107 serving as a focus detecting unit, the reliability of the result by the focus detecting unit.

In the state in which the contrast estimate Cnt is greater than a first specific value, in the case where the defocus amount DEF is smaller than a second specific value, the CPU 121 serving as the reliability estimating unit determines that the result by the imaging element 107 serving as the focus detecting unit is reliable. In the case where the defocus amount DEF is greater than the second specific value, the CPU 121 serving as the reliability estimating unit determines that the result by the focus detecting unit is unreliable.

In this embodiment, as illustrated in FIG. 12, focus adjustment is performed using the result by the focus detecting unit for which it is determined that the reliability is high.

In focus detection using a phase difference method, objects for which erroneous range finding is highly likely to occur include an object that is small relative to the sampling period of a focus detection pixel, an object having a high periodicity, and the like.

Since focus detection pixels, an A-image pixel and a B-image pixel, cannot be arranged at the same position, it is difficult to capture the same object by the A image and the B image for an object with a sampling period or less. Thus, for some objects, correlation is obtained for image signals obtained by capturing different objects between the A image and the B image, and the situation in which a false amount of image deviation is calculated may occur.

Furthermore, for an object with a high periodicity, since a plurality of shift amounts for which the calculated correlation is high at the time of correlation arithmetic operation exist, high correlation is obtained for different objects between the A image and the B image. Thus, the situation in which a false amount of image deviation is calculated occurs.

In the situation in which such erroneous range finding occurs, the determination as to erroneous range finding is performed on the basis of the contrast estimate Cnt expressed by formula (2) and the detection defocus amount DEF in this embodiment. In FIG. 12, arithmetic operation for degrading the reliability is performed for the regions expressed by oblique line portions. In the case where with respect to the detection defocus DEF, the contrast estimate Cnt, which is contrast information, is equal to or greater than a specific threshold, arithmetic operation for degrading the reliability of range-finding calculation is performed.

In step S807, a contrast estimate threshold Cth, which is determined on the basis of the detection defocus amount, is calculated. The relationship between the detection defocus amount and the contrast estimate threshold Cth is expressed by the dotted lines in FIG. 12. Then, in step S808, the determination as to erroneous range finding is performed by comparing whether or not the contrast estimate Cnt, which is calculated in step S806, is equal to or greater than the contrast estimate threshold Cth, which is calculated in step S807. In the case where the contrast estimate Cnt is within the region expressed by the oblique line portions of FIG. 12, it is determined that erroneous range finding is highly likely to occur. Then, in step S809, processing for degrading the reliability of the range finding result is performed. In step S807, the reliability FLVL is calculated using formula (3) in accordance with the difference between the contrast estimate Cnt and the threshold Cth.

$$FLVL(Cnt-Cth)=FLVL\times E(Cnt-Cth) \quad (3)$$

Here, E(Cnt−Cth) is proportional to the value of Cnt−Cth and is a function for increasing FLVL(Cnt−Cth) (degradation in reliability) in accordance with an increase in Cnt−Cth. FLVL=1/Corr(d) is set.

Then, in step S810, the determination as to whether or not range-finding calculation has been completed for all the range-finding lines within the range-finding region is performed. In the case where the range-finding calculation for all the range-finding lines has not been completed, similar processing is performed for a different line in step S802.

Then, in step S811, processing for preferentially using information with high reliability (small FLVL) among a plurality of focus detection lines within the range-finding region is performed, and the final range-finding result is determined.

Then, in step S812, the process returns to step S707 of the main flow of FIG. 7.

In this embodiment, as the determination as to erroneous range finding, the contrast estimate Cnt, which is calculated on the basis of a focus detection signal, and the detection defocus amount DEF are used. Here, although a signal of a focus detection pixel is used for calculating the contrast estimate of an image, the contrast estimate calculated from an imaging pixel may be calculated, similar to a contrast estimate calculated by contrast AF as is well known. In this case, as an imaging pixel at which the contrast estimate, which is contrast information, is calculated, an imaging pixel in a region near a focus detection pixel at which calculation is to be performed needs to be used.

In the case where it is determined that erroneous range finding has been performed, the imaging plane phase difference AF based on FIGS. 4A and 4B is stopped and is switched to TV-AF (contrast AF). Alternatively, in the case where it is determined that erroneous range finding has been performed, the imaging plane phase difference AF based on FIGS. 4A and 4B is stopped, and AF (autofocusing) control is not necessarily performed.

In step S707 of FIG. 7, it is determined whether or not the detection defocus amount is smaller than or equal to the tolerance. In the case where the detection defocus amount is equal to or greater than the tolerance, it is determined that it is in the out-of-focus state. In step S708, a focus lens is driven, and then, step S801 to step S707 are performed again. Then, in the case where it is determined in step S707 that the in-focus state is reached, in-focus display is performed in step S709. Then, the process proceeds to step S710.

In step S710, it is determined whether or not an on-operation is performed for a photographing start switch. In the case where an on-operation is not performed, a photographing standby state is maintained in step S710. When an on-operation for the photographing start switch is performed in step S710, the process proceeds to step S901, and a photographing subroutine is performed.

FIG. 9 is a flowchart of the photographing subroutine. When the photographing start switch is operated, the process undergoes step S901 and a light quantity adjustment diaphragm is driven in step S902 to perform aperture control of a mechanical shutter defining the exposure time. In step S903, image reading for photographing a high-pixel still image, that is, reading of the entire pixels is performed. In step S904, defective pixel interpolation for read image signals is performed. That is, since output of a focus detection pixel does not include RGB color information for imaging and corresponds to a defective pixel in terms of acquisition of an image, an image signal is generated by interpolation based on information of peripheral imaging pixels.

In step S905, image processing including γ correction of an image, edge enhancement, and the like is performed. In step S906, a captured image is recorded on the flash memory 133. In step S907, a photographed image is displayed on the display device 131. In step S908, the process returns to the main flow of FIG. 7.

After returning to the main flow of FIG. 7, the process terminates a series of photographing operations in step S712.

The embodiment explained above is merely a typical example. In implementation of the present invention, various modifications and changes may be made to the embodiment.

Second Embodiment

In the first embodiment, as the erroneous range-finding determination of a focus detection result, the contrast estimate Cnt, which is calculated on the basis of a focus detection signal, and the detection defocus amount DEF are used. Here, even when the above-described degree of coincidence FLVL of a pair of image signals (two images) is used instead of the contrast estimate of an image, similar effects can be achieved.

As in the first embodiment, the imaging element 107 in this embodiment also includes a first photoelectric conversion cell that outputs a first signal for phase difference detection, which is obtained by detecting a plurality of light fluxes transmitted through different exit pupils of the photographing optical system, using a plurality of focus detection pixels $S_{HA}$ and $S_{HB}$, and a second photoelectric conversion cell that outputs a second signal for image generation, which is obtained by detecting an object image transmitted through the photographing lens, using an imaging pixel.

Figure 11:
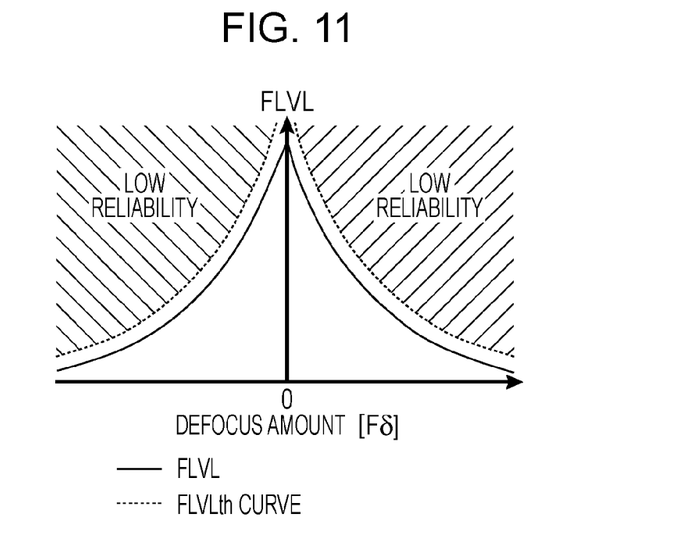
FIG. 11 is a relationship diagram of the degree of coincidence of two images and detection defocus in the first embodiment of the present invention.

For performance of focus detection calculation using a phase difference method, the CPU 121 has a function of a correlation estimate calculating unit for calculating the correlation estimate in FIG. 11.

The relationship of the degree of coincidence FLVL of a pair of image signals (two images) relative to the defocus amount is expressed by the solid lines of FIG. 11. As the position of a lens is closer to an in-focus position, the calculated degree of coincidence FLVL of two images becomes higher. In this figure, in the case of a region expressed by the oblique lines, arithmetic operation for degrading the reliability of the detection defocus amount is performed. In the case where the degree of coincidence FLVL of two images relative to the detection defocus DEF is equal to or greater than a specific value, arithmetic operation for degrading the reliability of range-finding calculation is performed.

Figure 13:
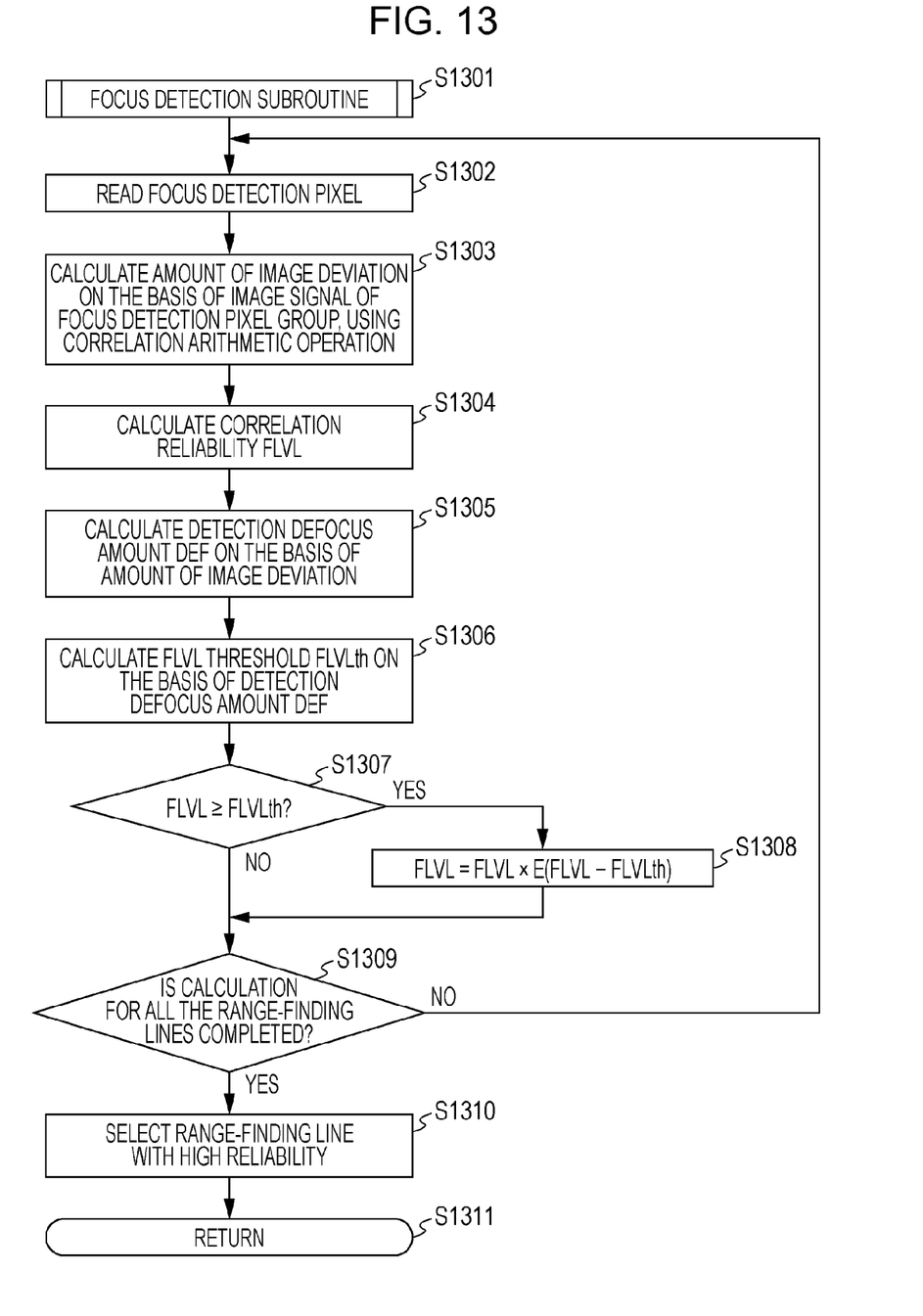
FIG. 13 is a flowchart illustrating a focus detection algorithm operation according to a second embodiment of the present invention.

FIG. 13 is a flowchart of a focus detection subroutine performed when the degree of coincidence FLVL of two images is used instead of the contrast estimate Cnt, which is used for the erroneous range-finding determination in FIG. 8. When the process jumps to this subroutine in step S1301, focus detection pixels contained in the focus detection region determined in step S705 of the main routine are read in step S1302. In step S1303, correlation arithmetic operation for the obtained two images is performed, and the relative amount of a positional deviation between two images is calculated.

Then, in step S1304, the reliability FLVL of the result of the correlation arithmetic operation is calculated.

Then, in step S1305, the defocus amount DEF is calculated by multiplying the amount of image deviation calculated in step S1303 by a specific defocus conversion factor. Then, in step S1306, a threshold FLVLth of the degree of coincidence of two images is calculated on the basis of the detection defocus amount DEF. The relationship between the detection defocus amount and the threshold FLVLth of the degree of coincidence of two images is expressed by the dotted line in FIG. 11.

Then, in step S1307, the determination as to erroneous range finding is performed by comparing whether or not the degree of coincidence FLVL of two images calculated in step S1304 is equal to or greater than the threshold FLVLth of the degree of coincidence of two images calculated in step S1306.

In step S1308, the reliability FLVL is calculated using formula (4) in accordance with the difference between the degree of coincidence FLVL of two images and the threshold FLVLth.

$$FLVL(FLVL-FLVLth)=FLVL \times E(FLVL-FLVLth) \quad (4)$$

Here, E(FLVL−FLVLth) is proportional to the value of FLVL−FLVLth and is a function for increasing FLVL (FLVL−FLVLth) (reducing reliability) in accordance with an increase in FLVL−FLVLth.

Then, in step S1309, the determination as to whether or not range-finding calculation for all the range-finding lines within the range-finding region has been completed is performed. In the case where range-finding calculation for all the range-finding lines has not been completed, similar processing is performed for a different line in step S1302.

In FIG. 11, in the case where the degree of coincidence FLVL of a pair of image signals is small and the defocus amount DEF [Fδ] is near zero, it is determined that the reliability is high (reliable). In the case where the degree of coincidence FLVL of a pair of image signals is small and the defocus amount DEF [Fδ] is large, it is determined that the reliability is low (unreliable).

By performing the determination as to the reliability in FIG. 11, in the case where the degree of coincidence FLVL of a pair of image signals is small and the defocus amount DEF [Fδ] is large, it is determined that the reliability is low (unreliable). Thus, both the maintenance of the focus detection performance based on the imaging plane phase difference AF and the prevention of the degradation of image quality can be achieved.

The CPU 121 serving as a reliability estimating unit estimates, on the basis of the correlation illustrated in FIG. 11 between the result by the CPU 121 serving as a correlation estimate calculating unit and the result by the CPU 121 serving as a focus detecting unit, the reliability of the result by the CPU 121 serving as the focus detecting unit.

In the state in which the degree of coincidence FLVL of a pair of image signals is smaller than a third specific value, in the case where the defocus amount DEF is smaller than a fourth specific value, the CPU 121 serving as the reliability estimating unit determines that the result by the imaging element 107 serving as the focus detecting unit is reliable. In the case where the defocus amount DEF is greater than the fourth specific value, the CPU 121 serving as the reliability estimating unit determines that the result by the imaging element 107 serving as the focus detecting unit is unreliable.

In this embodiment, as illustrated in FIG. 11, focus adjustment is performed using the result by the focus detecting unit for which it is determined that the reliability is high.

Then, in step S1310, processing for preferentially using information with high reliability (small FLVL) among a plurality of focus detection lines within the range-finding region is performed, and the final range-finding result is determined.

In the case where it is determined that erroneous range finding has been performed, the imaging plane phase difference AF based on FIGS. 4A and 4B is stopped and is switched to TV-AF (contrast AF). Alternatively, in the case where it is determined that erroneous range finding has been performed, the imaging plane phase difference AF based on FIGS. 4A and 4B is stopped, and AF (autofocusing) control is not necessarily performed.

Then, in step S1311, the process returns to step S707 of the main flow of FIG. 7.

The relationship between the defocus amount and the degree of coincidence FLVL of two images illustrated in FIG. 11 depends on the characteristics of a photographing lens. Thus, by measuring and storing in advance, for individual photographing lenses, the relationship between various objects and the degree of coincidence FLVL of two images, cameras of an interchangeable lens type can also be applied.

OTHER EMBODIMENTS

The foregoing embodiments may also be implemented in terms of software by a computer (or a CPU, an MPU, or the like) of a system or an apparatus.

Thus, in order to implement the foregoing embodiments by a computer, a computer program itself supplied to the computer also implements the present invention. That is, a computer program itself for implementing functions of the foregoing embodiments is also included in the present invention.

A computer program for implementing the foregoing embodiments may be of any form as long as it can be read by a computer. For example, the computer program may be configured as object code, a program to be executed by an interpreter, script data to be supplied to an OS, or the like. However, the computer program is not limited to the example mentioned above.

A computer program for implementing the foregoing embodiments is supplied by a storage medium or wired/wireless communication to a computer. The storage medium for supplying the program is, for example, a magnetic storage medium, such as a flexible disk, a hard disk, or a magnetic tape, an optical/magneto-optical storage medium, such as an MO, a CD, or a DVD, a nonvolatile semiconductor memory, or the like.

Methods for supplying a computer program using wired/wireless communication include a method using a server on a computer network. In this case, a data file (program file) that may serve as a computer program forming the present invention is stored on a server. The program file may be of an execution type or source code.

Then, the data file is supplied by allowing the program file to be downloaded to a client computer that has accessed the server. In this case, the program file may be divided into a plurality of segment files, and the segment files may be arranged in different servers in a dispersed manner.

That is, a server device that provides a program file for implementing the foregoing embodiments to a client computer is also included in the present invention.

Furthermore, a storage medium in which a computer program for implementing the foregoing embodiments is encrypted and stored may be distributed, key information for decrypting the encryption may be supplied to a user who satisfies specific conditions, and installation to a computer owned by the user may be permitted. For example, the key information can be supplied by allowing the user to download the key information from the homepage via the Internet.

Furthermore, a computer program for implementing the foregoing embodiments may use the function of an OS that has already been operating on a computer.

Furthermore, part of a computer program for implementing the foregoing embodiments may be configured as firmware such as an expansion board to be inserted to a computer or may be executed by a CPU included in an expansion board or the like.

According to the present invention, in an imaging element including an imaging pixel group and a focus detection pixel group, both the maintenance of focus detection performance and the prevention of the degradation of image quality can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2012/062379, filed May 15, 2012, which is hereby incorporated by reference herein in its entirety.

The invention claimed is:

1. A focus adjustment apparatus comprising:
an imaging element including a first photoelectric conversion cell that outputs a first signal for phase difference detection obtained by detecting a plurality of light fluxes transmitted through different exit pupils of a photographing optical system using a plurality of focus detection pixels and a second photoelectric conversion cell that outputs a second signal for image generation obtained by detecting an object image transmitted through the photographing optical system using an imaging pixel;
a contrast calculating unit for calculating contrast information on the object image based on at least one of the first signal and the second signal;
a focus detecting unit for performing focus detection using a phase difference method on the basis of the first signal; and
a reliability estimating unit for estimating reliability of a result by the focus detecting unit,
wherein the reliability estimating unit estimates the reliability of the result by the focus detecting unit on the basis of correlation between information on contrast estimate by the contrast calculating unit and information on a defocus amount by the focus detecting unit, and
wherein the reliability estimating unit determines that the reliability of the result by the focus detecting unit is low in a case where the information on the contrast estimate is higher than a first threshold value and the information on the defocus amount is larger than a second threshold value.

2. The focus adjustment apparatus according to claim 1, wherein the information on the contrast estimate is a contrast estimate, and the information on the defocus amount is a defocus amount.

3. The focus adjustment apparatus according to claim 2, wherein in a state in which the contrast estimate is greater than a first specific value, in a case where the defocus amount is smaller than or equal to a second specific value, the reliability estimating unit determines that the result by the focus detecting unit is reliable, and in a case where the defocus amount is greater than the second specific value, the reliability estimating unit determines that the result by the focus detecting unit is unreliable.

4. A focus adjustment apparatus comprising:
an imaging element including a first photoelectric conversion cell that outputs a first signal for phase difference detection obtained by detecting a plurality of light fluxes transmitted through different exit pupils of a photographing optical system using a plurality of focus detection pixels and a second photoelectric conversion cell that outputs a second signal for image generation obtained by detecting an object image transmitted through the photographing optical system using an imaging pixel;
a focus detecting unit for performing focus detection using a phase difference method on the basis of the first signal;
a correlation estimate calculating unit for calculating a correlation estimate for performance of focus detection calculation using the phase difference method; and
a reliability estimating unit for estimating reliability of a result by the focus detecting unit,
wherein the reliability estimating unit estimates the reliability of the result by the focus detecting unit on the basis of correlation between information on a degree of coincidence of a pair of image signals by the correlation estimate calculating unit and information on a defocus amount by the focus detecting unit, and
wherein the reliability estimating unit determines that the reliability of the result by the focus detecting unit is low in a case where the information on the degree of coincidence of a pair of image signals is higher than a first threshold value and the information on the defocus amount is larger than a second threshold value.

5. The focus adjustment apparatus according to claim 4, wherein the information on the degree of coincidence of a pair of image signals is the degree of coincidence of a pair of image signals, and the information on the defocus amount is a defocus amount.

6. The focus adjustment apparatus according to claim 5, wherein in a state in which the degree of coincidence of the pair of image signals is greater than a third specific value, in a case where the defocus amount is smaller than or equal to a fourth specific value, the reliability estimating unit determines that the result by the focus detecting unit is reliable, and in a case where the defocus amount is greater than the fourth specific value, the reliability estimating unit determines that the result by the focus detecting unit is unreliable.

7. A control method for a focus adjustment apparatus including an imaging element having focus detection pixels and imaging pixels, the method comprising:
generating, using a plurality of focus detection pixels, a first signal for phase difference detection by detecting a plurality of light fluxes transmitted through different exit pupils of a photographing optical system;
generating, using at least one imaging pixel, a second signal for image generation by detecting an object image transmitted through the photographing optical system;
calculating contrast information on the object image based on at least one of the first signal and the second signal;
performing focus detection of the object image using a phase difference method on the basis of the first signal; and
estimating reliability of a result by the focus detection,
wherein the reliability of the result by the focus detection is estimated on the basis of correlation between information on contrast estimate of the calculating contrast and information on a defocus amount of the focus detection, and
wherein the reliability of the result by the focus detection is determined to be low in a case where the information on the contrast estimate is higher than a first threshold value and the information on the defocus amount is larger than a second threshold value.

8. A control method for a focus adjustment apparatus including an imaging element having focus detection pixels and imaging pixels, the method comprising:

generating, using a plurality of focus detection pixels, a first signal for phase difference detection by detecting a plurality of light fluxes transmitted through different exit pupils of a photographing optical system;

generating, using at least one imaging pixel, a second signal for image generation by detecting an object image transmitted through the photographing optical system;

performing focus detection of the object image using a phase difference method on the basis of the first signal;

calculating a correlation estimate for performance of focus detection calculation using the phase difference method; and estimating reliability of a result by the focus detection, wherein the reliability of the result by the focus detection is estimated on the basis of correlation between information on a degree of coincidence of a pair of image signals of the calculating correction estimate and information on a defocus amount of the focus detection, and wherein the reliability of the result by the focus detection is determined to be low in a case where the information on the degree of coincidence of a pair of image signals is higher than a first threshold value and the information on the defocus amount is larger than a second threshold value.

* * * * *